Jan. 17, 1967   J. R. BEEBE ETAL   3,298,545
SILO UNLOADER WALL GUIDE WHEEL MOUNTING
Filed June 17, 1965   2 Sheets-Sheet 1

INVENTORS.
JAMES R. BEEBE
EIVIND M. RAMBO
BY
ATTORNEYS.

Jan. 17, 1967  J. R. BEEBE ETAL  3,298,545
SILO UNLOADER WALL GUIDE WHEEL MOUNTING
Filed June 17, 1965  2 Sheets-Sheet 2
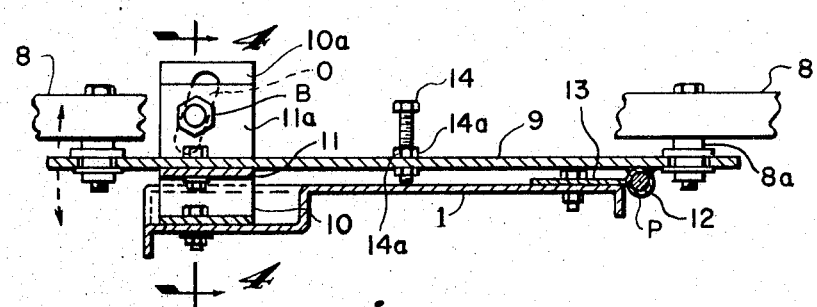
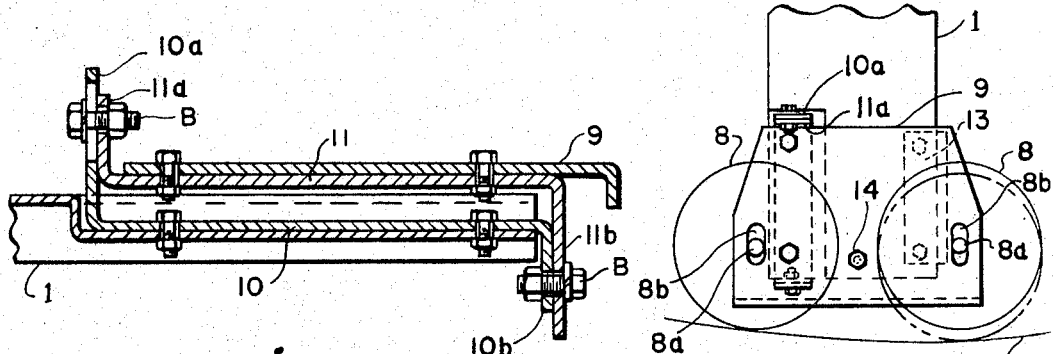
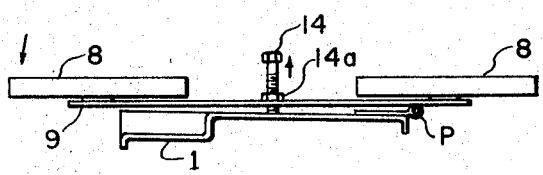
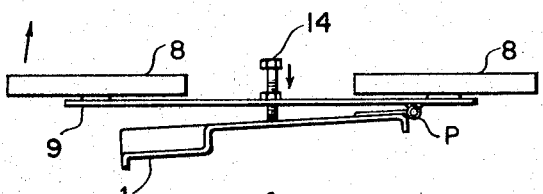
INVENTORS.
JAMES R. BEEBE
EIVIND M. RAMBO
BY
ATTORNEYS.

United States Patent Office 3,298,545
Patented Jan. 17, 1967

3,298,545
SILO UNLOADER WALL GUIDE
WHEEL MOUNTING
James R. Beebe, Celina, Ohio, and Eivind M. Rambo, Ogdensburg, Wis., assignors to Avco Corporation, Coldwater, Ohio, a corporation of Delaware
Filed June 17, 1965, Ser. No. 464,606
3 Claims. (Cl. 214—17)

This invention relates to silo unloaders and is particularly concerned with the type of unloader in which a main frame is rotated around the center of a substantially circular silo having a cylindrical wall with wall guide wheels horizontally mounted at the end of the frame for maintaining the end of a predetermined distance from said wall. The invention is particularly concerned with means for orienting wall guide wheel mounting means to maintain the wheels in horizontal position and to avoid a tendency of the wall end of the unloader to run up the wall of the silo.

Silo unloaders suspended from the top of the silo and functioning to cause a radially oriented auger to sweep the surface of the silage toward the center and throw it upwardly and outwardly through a silo door are well known. Such unloaders normally have one or two augers housed in a main frame which extends radially of the silo with one or two wall guide wheels on the wall end thereof functioning to cause the end to travel circumferentially in close proximity to the silo wall. With suspended silo unloaders, particularly those having only one auger, the center of gravity of the silo unloader is such that the trailing edge of the unloader hangs lower than the forward edge when supported by the suspension cable. Since the guide wheels are supported at the end of the silo unloader frame, some means for orienting the wheels into an accurate horizontal position is necessary. Prior attempts to overcome this problem involved means for twisting the silo unloader frame which has been found to be disadvantageous not only in that it tends to put undue stress on the auger bearings and other parts but also makes adjustment unreliable.

The present invention provides a means by which the positioning of the guide wheels in a horizontal position can be accomplished accurately, reliably and without twisting the silo unloader main frame. Briefly described, it comprises guide wheel mounting means disposed at the end of the main frame of a silo unloader, one or more guide wheels journaled on vertically disposed bearings secured to said means, means for tilting said mounting means on an axis radially of the silo to orient said wheel or wheels for rotation in a horizontal plane, and means for securing said mounting means in the desired horizontal position.

Objects and advantages of the invention will become apparent upon reference to the following specification and drawings of an illustrative embodiment, in which:

FIG. 3 is a section taken along line 3—3 of FIG. 2, with parts broken away for clarity;

FIG. 4 is a section on line 4—4 of FIG. 3;

FIG. 5 is a fragmentary plan view of the wall end of the unloader with parts broken away or sketched in phantom lines;

FIG. 6 is an illustrative section taken along line 3—3 of FIG. 2 showing the adjustment of the device in one position; and FIG. 7 is a similar view showing the adjustment in another position.

Figure 1:
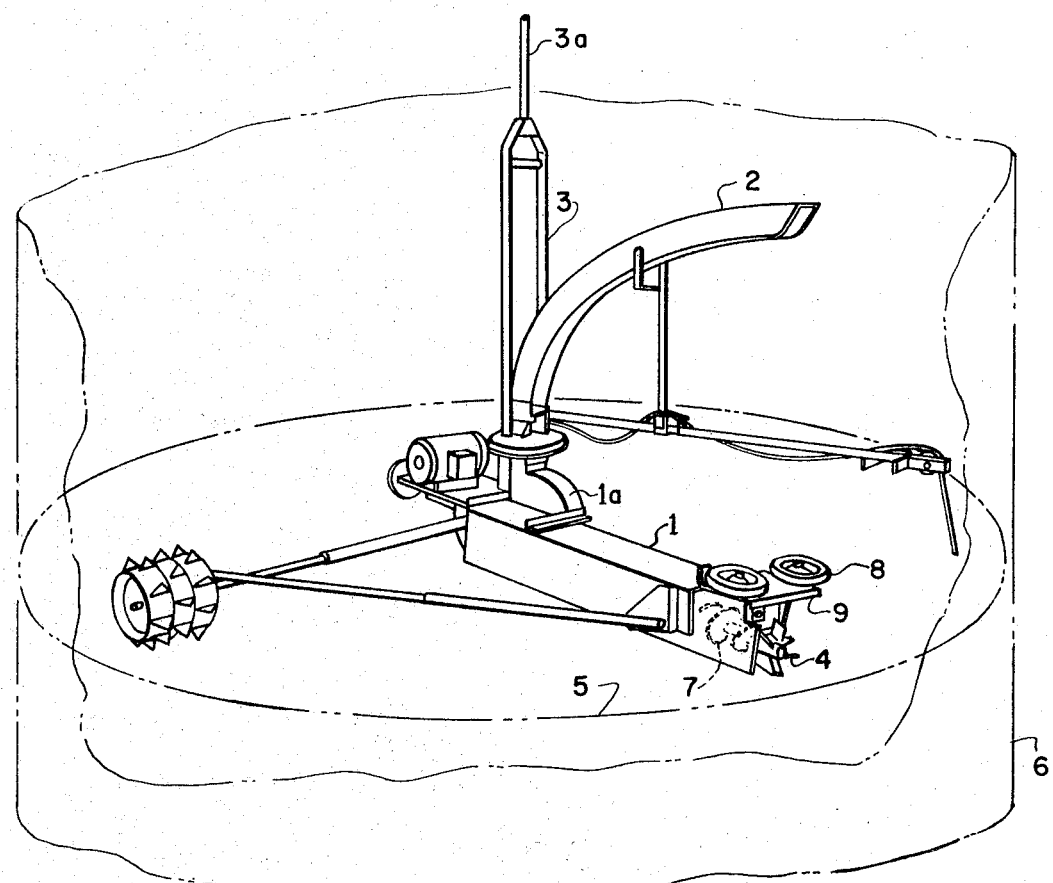
FIG. 1 is a perspective view of a silo unloader embodying the invention disposed within a silo.
Figure 2:
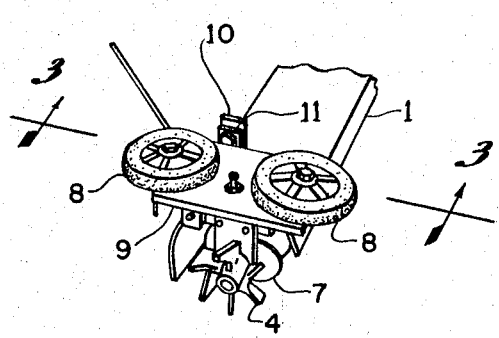
FIG. 2 is a perspective view of the end of the silo unloader frame to which the novel mounting means is secured.

A silo unloader of generally conventional design is illustrated in FIG. 1 comprising a main frame 1 carrying one or more radially disposed augers 7 which move silage from the surface inwardly toward throwers disposed within a supplementary housing 1a. A conventional silage throwing device within housing 1a picks up silage from the inner end of the auger or augers and throws it upwardly into spout 2, from which it is thrown outwardly through a door of the silo. Support 3 and cable 3a suspend the unloader centrally of the silo.

Adjacent the end of frame 1 and at the end of the auger shaft is a wall cleaning wheel 4 adapted to clean the peripheral, internal, circumferential surface 5 of the wall 6 of the silo at approximately the level where the silage is removed by the radial pickup augers within frame 1.

Except for the wall guide wheel mounting device the construction and operation of which will now be explained, the other mechanisms shown generally in FIG. 1 will not be described since they are well known in the art and form no part of the present invention as such.

Referring particularly to FIGS. 2 to 5, the wall guide wheel mounting of the invention comprises a plate 9 hingedly and adjustably mounted on the wall end of the frame 1. At the ends of the plate are vertically disposed stub shafts 8a secured in openings 8b of the plate and upon which wall guide wheels 8 are journaled in suitable bearings so that the wheels rotate in a horizontal plane with the periphery thereof contacting, at least in the case of one wheel, the vertical wall 6 of the silo.

The mounting orientation is accomplished by providing a strap 11 secured to the bottom of the plate 9 and extending generally radially of the silo. The strap 11 has an upturned ear 11a and a downturned ear 11b for cooperating with a similar strap 10 secured to the frame 1 in the manner which will now be described.

Strap 10 is suitably secured to the frame 1 and comprises an upturned ear 10a and a downturned ear 10b extending upwardly and downwardly respectively, adjacent the upturned ear 11a and downturned ear 11b of strap 11. Suitable openings, one of which is elongated, as shown at O in FIG. 3, are provided in the ears for receiving a fastening bolt B.

Fixedly secured to the bottom of the plate 9 adjacent one end thereof is a gudgeon 12 and secured to the top of the frame 1 is a hinge plate 13, which parts are oriented as shown in FIG. 3 to permit the plate 9 to pivot about hinge pin P. It will be observed that the parts are so arranged that the axis of the hinge pin P is substantially radially of the silo unloader, thus permitting the plate 9 to pivot on an arc as indicated by the arrows in FIGS. 3, 6 and 7.

Intermediate the ends of the plate 9 is provided means for positioning the plate by moving it around its pivot P, comprising a right-hand-threaded set screw 14 threaded into suitable nuts 14a welded to the plate 9. An opening in plate 9 slightly larger than the set screw is provided.

From the above description it will be apparent that as the set screw is turned counterclockwise or upwardly as shown in FIG. 6, plate 9 will move downwardly around pivot P, in the direction of the arrow of FIG. 6, toward frame 1, and as the set screw is moved downwardly or turned clockwise as shown in FIG. 7, the plate 9 will move upwardly around pivot P with respect to the frame 1 in the direction of the arrow in FIG. 7.

Accordingly, should the position of the main frame on the silage be such that the guide wheels 8 are not horizontally disposed, this result can be assured by suitable positioning of the plate by set screw 14 and when this has been completed, bolts B can be tightened so that the ears 10a, 11a, 10b and 11b are fixed relative to each other and the desired orientation thus secured reliably maintained.

Having thus described our invention, we claim:

1. In a silo unloader having a main frame rotatable around the center of a substantially circular silo and suspended from the top thereof and having at least one horizontally disposed wall guide wheel mounted at the end of said frame to roll over the silo wall and guide said end therearound, a mounting plate for said wheel, means acting between said frame and said plate for tilting said plate along an axis substantially radially of the silo to orient said wheel into horizontal position and means to secure said plate in adjusted position.

2. In a silo unloader having a main frame suspended from the top of the silo, guide wheel mounting means disposed at the end of said frame, guide wheels supported on said means and journaled on vertically disposed bearings, means acting between said frame and said mounting means for tilting said mounting means on an axis radially of the silo to position said wheels for rotation in a horizontal plane, and means for securing said mounting means in the desired horizontal position.

3. A silo unloader wall guide wheel mounting device for a suspended silo unloader having a radially extending main auger-supporting frame, in combination: a plate hinged at the end of said frame adjacent the silo wall on a pivot disposed radially of said silo, a guide wheel supported on said plate for rotation in a horizontal plane, means acting between said frame and said plate for swinging said plate around said pivot, and means for permanently securing said plate in horizontal position thereby assuring that said wheel will describe an accurate horizontal path around the inner circumference of said silo wall.

References Cited by the Examiner
UNITED STATES PATENTS 3,223,256  12/1965  Buschbom _____ 214—17
3,229,827   1/1966  Kucera _____ 214—17

GERALD M. FORLENZA, *Primary Examiner.*

ROBERT G. SHERIDAN, *Examiner.*